United States Patent [19]

Kornfeld

[11] Patent Number: 4,873,657

[45] Date of Patent: Oct. 10, 1989

[54] METHOD FOR SIMULATING AN IMAGE BY CORRELLATION

[75] Inventor: Gertrude H. Kornfeld, Alexandria, Va.

[73] Assignee: The United States of America as represented by the Secretary of the Army, Washington, D.C.

[21] Appl. No.: 120,458

[22] Filed: Nov. 13, 1987

[51] Int. Cl.$^4$ ............................................. G06F 15/66
[52] U.S. Cl. .................................... 364/578; 364/521; 382/42
[58] Field of Search ....................... 364/516, 521, 578; 382/42

[56] References Cited

U.S. PATENT DOCUMENTS

| 4,402,009 | 8/1983 | Rathjens et al. | 364/516 X |
| 4,654,876 | 3/1987 | Atkins | 382/42 X |
| 4,747,155 | 5/1988 | Dotson | 382/42 |

*Primary Examiner*—Felix D. Gruber
*Attorney, Agent, or Firm*—Max L. Harwell; John E. Holford; Anthony T. Lane

[57] ABSTRACT

The invention provides a of simulating the performance of systems such as far-infrared imagers which must be described with shift variant spread functions and non white noise. Simple approximations are substituted for the spread functions and these are convolved with the pixel samples before and after the noise is added to produce a degraded but very realistic simulation of the video signal or other characteristic output of the system.

4 Claims, 3 Drawing Sheets

EQUATIONS

I. $h(n,m) = A_n \prod_{j=1}^{m} e_{(n-j)}$

II. $e_j = \exp(-\Delta/\gamma_j)$

III. $1 = A_n \{1 + e_n [1 + e_{(n-1)} + e_{(n-1)} e_{(n-2)} + ....]\} = A_n \{1 + (e_n/A_{(n-1)})\}$

IV. $A_n \approx A_{(n-1)} \approx (1 - e_n)$

V. $P_{om}(n) = A_n \{P_i(n) + e_n [P_i(n-1) + e_{(n-1)} P_i(n-2) + e_{(n-1)} e_{(n-2)} P_i(n-3) + ....]\}$
$= \{A_{(n-1)} P_i(n) + e_n P_{om}(n-1)\} / \{A_{(n-1)} + e_n\}$

VI. $P_{om}(n) = (1-e_n) P_i(n) + e_n P_{om}(n-1)$.

VII. $P_{op}(n) = (1-e_n) P_i(n) + e_n P_{op}(n+1)$

VIII. $P_o(n) = \frac{1}{2} \{P_{op}(n) + P_{om}(n) - b_i P_i(n)\}$

IX. $P_o(n) = b_E P_{OE}(n) - b_I P_{OI}(n)$

X. $Y = \frac{1}{\sqrt{2\pi}} \int_0^X \exp(-\frac{1}{2} t^2) dt$

XI. $X = 2.5 Y (1 + Y^2(1 + 3Y^2(1 + 4Y^2)))$  When $|Y| \leq 0.4$

XII. $X = \pm(-2\ln[1-2|Y|] - 0.509)^{1/2}$  When $|Y| < 0.4$

FIG. 2

METHOD FOR SIMULATING AN IMAGE BY CORRELLATION

The invention described herein may be manufactured, used, and licensed by the U.S. Government for governmental purposes without the payment of any royalties thereon. BACKGROUND

1. Field

The invention deals with methods to simulate images formed by optical scanning systems and the like wherein the imperfectly focussed image can be described by a spread function which undergoes some variation. Of particular interest are a family of far-infrared imagers wherein the far-infrared image is scanned over a diode detector or array of detectors using lenses and/or mirrors and is periodically sampled to define pixels.

2. Background

In an ideal optical system a small uniformly illuminated spot on an image should be reproduced as a uniformly illuminated spot on a focal plane. Mathematically this can be defined as a delta function. In a real system the intensity over the spot varies to define a spread function. The Fourier transform of this spread function is called an Optical Transfer Function (OTF). A popular performance parameter is the absolute value of the OTF, known as the Modulation Transfer Function (MTF). In a scanning system the spot can be shifted to different places in the focal plane. If the spread function is different from place-to-place in the focal plane the system has a shift variant spread function. In the presence of a shift variant spread function simulation by Fourier transformation is illegitimate. The loss of picture quality, therefore, cannot be simulated by the standard method; wherein the undegraded picture is Fourier transformed, so that convolution with the spread function can be replaced by a multiplication with the Optical Transfer Function (OTF). A new approach is necessary to include this type of degradation into the simulation of the system.

SUMMARY OF THE INVENTION

There is provided a method of simply generating non-violent shift variant spread functions. This is then used, for example, to convert idealized far-infrared images of targets to match the actual video output images produced by infrared imagers.

BRIEF DESCRIPTION OF THE DRAWINGS

The invention is best understood with reference to the drawings wherein:

FIG. 2 shows the equations needed to perform the simulation of an array of energy sources having a shift variant spread function.

DESCRIPTION OF THE PREFERRED EMBODIMENT

Figure 1:
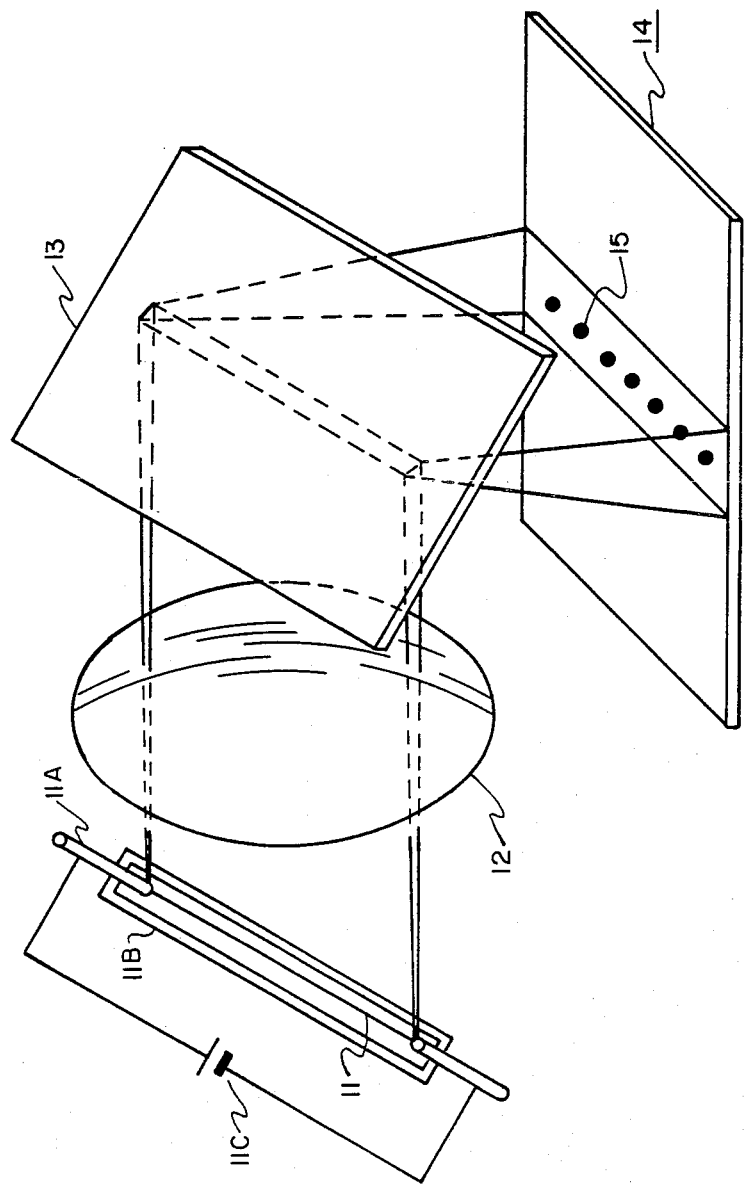
FIG. 1 shows a prior art method of measuring the spread function of a thermal detector.

As a first step in the practice of the invention, the shift variant spread functions of various parts in the system must be provided. (Usually by the manufacturer.) In an X-Y scanned system like the FORWARD LOOKING INFRARED imager (FLIR)10 partially shown in FIG. 1 there is a simple measurement method for the optics spread function. Instead of a point source, a thin vertical line source 11 is provided. This can be a thin nichrome wire supported at each end by an electrode 11A which in turn is supported by a glass envelope 11B enclosing the wire in a vacuum. A source of emf 11C is connected between the electrodes to warm the wire. The thin line image of the heated wire is projected by lens 12 and rotating mirror 13 onto the image space defining element 14 which carries an array of photodiodes 15. The intensity distribution measured by the photodiodes normal to this line as it moves horizontally from the center to the edge of the screen provides the data for the spread function of the line. The same measurement is repeated with a horizontal line moved vertically by reorienting elements 11 and 13 relative to elements 12 and 15. Images are available with both horizontal and vertical deflecting mirrors and a single diode, which also can be used without reorientation. A staring array or any rows of diodes can also be used, if the source is moved normal to the optical axis of the line source. Staring arrays based on the charge-coupled-devices (CCD's) are now quite common. The value of the spread function at any point (X,Y) for a given mirror position (i.e. time) is simply the product of the X and Y line values measured above. Specification of the decaying spread function is further simplified by using conventional curve fitting techniques. For example, with the X-Y scanning system a reasonable match is achieved by assuming an exponential form for the decaying function.

FIG. 2 shows a table of equations which applicant uses in the convolution of the various spread functions. Shift variant spread functions can be divided into gradually and violently changing groups. Members of the gradually changing group, such as optical aberrations and the photodiode detector signals of a thermal imager, will be discussed, but other applications will be obvious to those skilled in the art. The detector signal of a scanning array thermal sensor or imager builds up and decays exponentially. A rotating or sinusoidally panning mirror causes the detector to point to different positions in object space. The perspective projection of the object space is digitized to define pixels. Each pixel is regarded as an input power source $P_i(I_x, I_y)$ where $I_x$ and $I_y$ are positions in units of delta ($\Delta$) on a square or rectangular matrix wherein adjacent pixels are separated by a distance delta in the X and Y directions, e.g. horizontal and vertical. The detector reading of the $n^{th}$ pixel is influenced by all previous pixels on the X or Y scan line. To determine the value of $P_i$ a convolution with a shift variant exponential spread function has to be performed. The influence the $(n-m)^{th}$ pixel has on the $n^{th}$ pixel is calculated beginning with the generalized spread function, Equation I of FIG. 2. This can be replaced by the short hand notation of Equation II. Here gamma subscript j is the distance in units of delta where only 37% of the beam intensity from the line image, previously discussed, remains.

In the violently shift variant case the normalization factor $A_n$ is difficult to establish, but in the gradual case the sum of all h(n,m) is normalized to unity, to preserve the total picture power, i.e., the relationship described by Equation III. The factorization of Equation III is possible because of the logarithmic property of the exponential. This approach greatly reduces the necessary number of computational steps required. In a standard convolution the output power of any detector $P_o(n)$ is calculated from all input powers $P_i(j)$ where [n-j] is smaller than the distance over which the spread function is larger than a predetermined minimum, e.g. about four standard deviations. We shall show in the following paragraph's that [n-j]operations per data point can be reduced to only 2 operations per data point. Since a digitization of this form involves on the order of a million data points, the computer time reduction afforded by the use of Equation III in a recursive method is substantial even in the shift invariant case. In the shift variant case the use of the standard convolution would be prohibitive because different spread functions would be necessary for the different data points.

As exponential decays are common in nature this method has broad application to many phenomena in which the simulation of the video output signal from a Thermal Imager is but one sample. The gradual change assumption allows the equivalences expressed by the approximate Equation IV, a result that also emerges from a geometric series in the shift invariant approximation.

No such invariance is assumed in the factorization of Equation III; the fractions $e_j$ can vary according to any desired condition. The output power $P_{om}(n)$ at the $n^{th}$ position is calculated from the input powers $P_i(j)$ at positions $j<n$ using the recursion relationships in the continued equation V, where $A_n$ was eliminated using Equation III. The subscripts i (input), om (out minus) apply for a left to right recursive convolution; the $n^{th}$ output emerges from the $(n-i)^{th}$ output. Equation V requires two recursion relationships and one division. In a case where the shift invariant approximation in the close vicinity of the $n^{th}$ position is acceptable, e.g. the thermal imager video signal, Equation IV can be used for the simplification expressed in Equation VI.

Equations V and VI use the same gradual change assumption, they are either both acceptable or both unacceptable, the latter in the presence of violent change wherein the normalization to unity (Equation III) is no longer possible. Notice that the derivation of the approximate Equation IV only requires negligible shift variance over an interval of two delta, but the usual Fourier transformation requires shift invariance over the entire picture plane, a much more stringent requirement.

Equation VI applies for the degradation calculation by a left to right scan in a farinfrared thermal imager. A right to left scan op (out plus) uses the $(n+i)^{th}$ position to calculate the $n^{th}$ position, i.e., as in Equation VII.

Convolution with a symmetrical spread function is expressed by the combination shown in Equation VIII. Here $b_i$ establishes the extent of necessary correction because the $n^{th}$ data point is included in both directions. The choice of $b_i=1$ describes a faithful representation of the exponential, but other choices of $b_i$ can be used for special effects. It is also possible to simulate asymmetry by different values of $e_n$ in $P_{om}$ and $P_{op}$. Such a spread function describes the image blurring due the imperfect shape of the optical elements.

Equations VI and VII, applied to the video signal from a thermal imager, describe the detector signal decay alone, whereas the imager's pre-amplifier introduces AC coupling. Simulation of partial AC coupling is advantageous for image edge enhancement, but a DC level must be maintained for simulation of ambient temperature estimates and orientations. AC coupling with partial DC restoration is expressed by Equation IX. The notions E (excitation) and I (inhibition) are borrowed from visual science. Here $b_E$ varies from 0 to 1 and $b_I=1$ for total AC coupling or $b_I=0$ for perfect DC restoration. Usually the fraction $e_{I(n)}$ is close to unity and $e_{E(n)}$ is small, so that edge effects can be faithfully simulated. The (n) subscript following the same subscript notation previously used broadly in Equations VI and VII.

An attractive feature of the above method of simulation is the facility of introducing a realistic simulation of non-white noise by means of a random number. A computationallly efficient method of establishing a random number with Gaussian distribution results from the inversion of the area function as described by Equation X. Standard series expansion solutions of Equation X were approximately inverted to provide expressions for x as shown in Equations XI and XII. Noise is simulated by a random number generator with the Gaussian distribution described by Equations X, XI and XII. Here Y is a random number that is normalized to range between $-0.5$ to $+0.5$. The use of the inversions XI and XII take about 5% of the computer time that the standard sum of random number generations uses to create Gaussian distributions.

Figure 3:
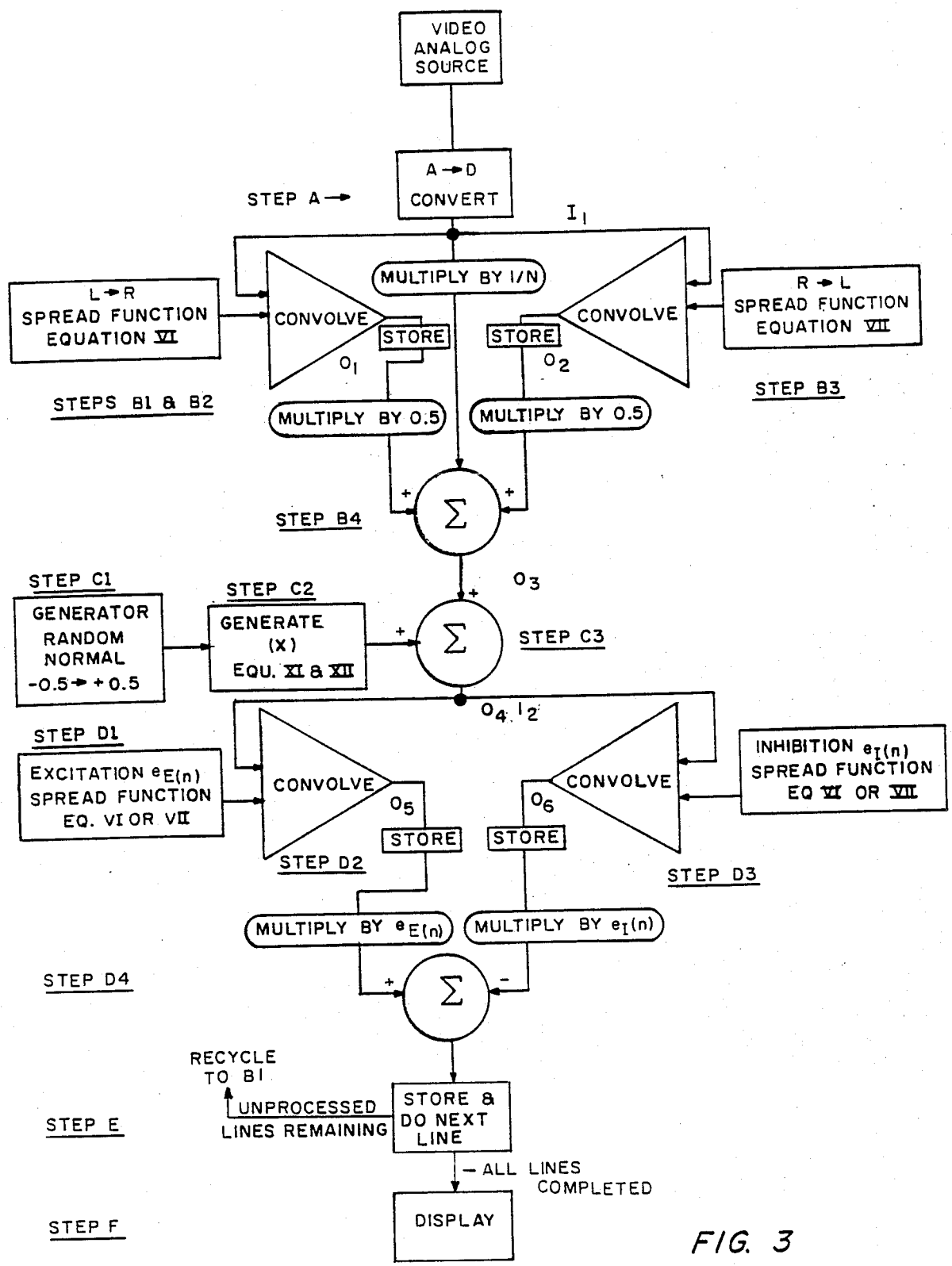
FIG. 3 shows a flow chart of the method of processing an idealized video image signal to simulate the image signal produced by a scanning detector.

FIG. 3 shows a flow chart of the image simulation method of the present invention. The notations $I_n$ and $O_n$, where n is an integer between 1 and 6, refer to input and output values of the pixels.

Beginning with an idealized image stored in a format that is readily accessable to a computer such as a floppy disk, a hard disk, laser disk, tape, a RAM, a ROM, or other similar medium, and the first line as the current line, the image is degraded to a more realistic form by the following steps:

A. digitize the image such that each picture element (PIXEL) represents a detector sample of the system to be simulated, thus providing a number of first sets of input pixel values, each set representing a scan line in the system image;

B. simulate the spread function of the optical elements (lenses, mirrors, etc.) by the substeps;

B1. convolve the input values for the current line with a right-to-left assymetrical spread function as defined in Equation VI, to obtain a first set of output values;

B2. store the first set of output values;

B3. repeat steps B1 and B2 with a left-to-right spread function as defined in Equation VII, to obtain and store a second set of output values;

B4. add half of each corresponding value in the first set of output values to half of each corresponding value in the second set of output values and subtract a given fraction of the corresponding input value, to obtain a third set of output values;

C. simulate non-white detector noise by the following substeps:

C1. generate a corresponding set of random numbers (y) for said third set, normalized between $-0.5$ and $+0.5$;

C2. transform each of the random numbers to a new value (x) as defined in Equations XI and XII;

C3. add the corresponding transformed random numbers to corresponding values in the third set, to form a fourth set of output values;

D. using the forth set as a second set of input values, simulate the combined detector motion-AC coupling spread function broadly defined by Equation IX of the detector amplifier by the substeps;

D1. convolve the second input set with the narrow excitation spread function of the system's infrared photodiode circuit using the one of Equations VI and VII that correspond to the scan direction of the current line, to form a fifth set of output values;

D2. store the fifth set of values;

D3. repeat steps D1 and D2 using the much broader inhibition spread function of the system's photodiode circuit, to form and store a sixth set of output values;

D4. subtract an inhibition fraction of each value in the sixth set from larger excitation fraction of the corresponding value in the fifth set, as indicated in Equation IX, to form a final set of output values for the finished pixels;

D5. store the final set of values;

E. store the last calculated set of output values and, if there are any lines remaining with input values not processed and stored as above, then repeat steps B through D4 with the next of the remaining lines as the current line.

For practical purposes the process is complete at step E where the simulation image exists in some storage medium, such as the currently popular magnetic tapes. The above digital format is th most reliable storage format currently available. Transforming the image to a visible image on a TV screen or monitor is an obvious step added merely for completeness of the concept.

The above method realistically degrades the image data and gives the noise specks their characteristic "sweepy tails". Such characteristics are of particular interest in designing Aided Target Recognition systems, which require a maximum amount of information about targets and the images they produce in detection systems in order to make reliable decisions. The steps above are defined as a serial process easily performed on a personal computer with adequate storage capacity. Those skilled in the art will appreciate that steps such as B1 nd B3 can be performed in parallel without the need to store the first set of values. The same is true for steps D1 and D3. The inhibition and excitation fractions will generally be near 0.5. Instead of completing each line before beginning another, all lines can be processed at each step (or group of steps), if desired.

I claim:

1. In the method of simulating an image projected by an optical scanning system which, due to the presence of specific lenses, mirrors and other such optical elements has an analog shift spread function, wherein said image is simulated by an idealized image in the form of an x-y array matrix of pixels, line scanned along the x axis, each spaced a distance $\Delta$ from adjacent pixels and having an input power $P_i(I_x, I_y)$ where Ix and Iy are positions in said matrix expressed as integral values of $\Delta$; a submethod for also simulating said spread function comprising the following steps:

A. digitize the image such that each picture element (PIXEL) represents a detector sample of the system to be simulated, thus providing a number of first sets of input pixel values, each said set representing a scan line in the system of image;

B. starting with the first image line as the current line simulate the spread function of the optical elements by the substeps;

B1. convolve said input values for said current line with a right-to-left assymetrical spread function $P_{om}(n)$, where $P_{om}(n)=(1-e_n)P_i(n)+e_nP_{om}(n-1)$, to obtain a first set of output values;

B2. store said first step of output values;

B3. repeat steps B1 and B2 with a left-to-right spread function $P_{op}(n)$, where $P_{op}(n) = (1-e_n)P_i(n)+e_nP_{op}(n-1)$, to obtain and store a second set of output values;

B4. add half of each corresponding value in said first set of output values to each corresponding value in said second set of output values and subtract a given fraction of the corresponding input value, to obtain a third set of output values;

E. store the last completed set of output values, if any line remains unprocessed as above, then repeat steps B1 through E with each of the remaining lines in the image in place of said first image line as said current line; and F. display the resulting image as a shade of gray IV type image.

2. The method according to claim 1, further including the following steps between steps B4 and E:

C. simulate non-white detector noise by the following substeps:

C1. using said third set for said current line as a current third set, generate a corresponding set of random numbers (y) for said current third set, normalized between $-0.5$ and $+0.5$;

C2. transform each of the random numbers to a new value (x) as defined in $$X=2.5Y(1+Y^2(1+3Y^2(1+4Y^2))) \text{ When} |Y| \leq 0.4,$$
$$\text{and } X=\pm(-2\ln-0.509)^{\frac{1}{2}} \text{When} |Y| <0.4.$$

C3. add the corresponding transformed random numbers to corresponding values in said current third set, to form a fourth set of output values.

3. The method according to claim 2, further including the following steps between steps C3 and E:

D. simulate the combined detector motion-AC coupling spread function $P_o(n)$ broadly defined by $P_o(n)=b_EP_{OE}(n)-b_IP_{OI}(n)$, of the detector amplifier by the substeps;

D1. using said fourth set as a second set of input values, convolve the second input set with the narrow excitation spread function of the system's infrared photodiode circuit using the one of $P_{om}(n)=(1-e_n)P_i(n)+e_nP_{om}(n-1)$ and $P_{op}(n)=(1-e_n)P_i(n)+e_nP_{op}(n+1)$ that corresponds to the scan direction of said current line, to form a fifth set of output values;

D2. store the fifth set of values;

D3. repeat steps D1 and D2 using the much broader inhibition spread function of the system's photodiode circuit, to form and store a sixth set of output values; and D4. subtract an inhibition fraction of each value in the sixth set from a larger excitation fraction of the corresponding value in the fifth set, as indicated in Equation IX, to form a final set of output values for the finished pixels.

4. The method according to claim 2 wherein: the values for Y are defined as $$Y = \frac{1}{\sqrt{2\pi}} \int_0^X \exp(-\tfrac{1}{2}t^2)dt$$

* * * * *